C. PALMER.
R. BRIDEN, RECEIVER IN LUNACY OF SAID PALMER.
CASH AND AUTOGRAPHIC REGISTER.
APPLICATION FILED SEPT. 26, 1910.
1,033,456.
Patented July 23, 1912.
2 SHEETS—SHEET 1.
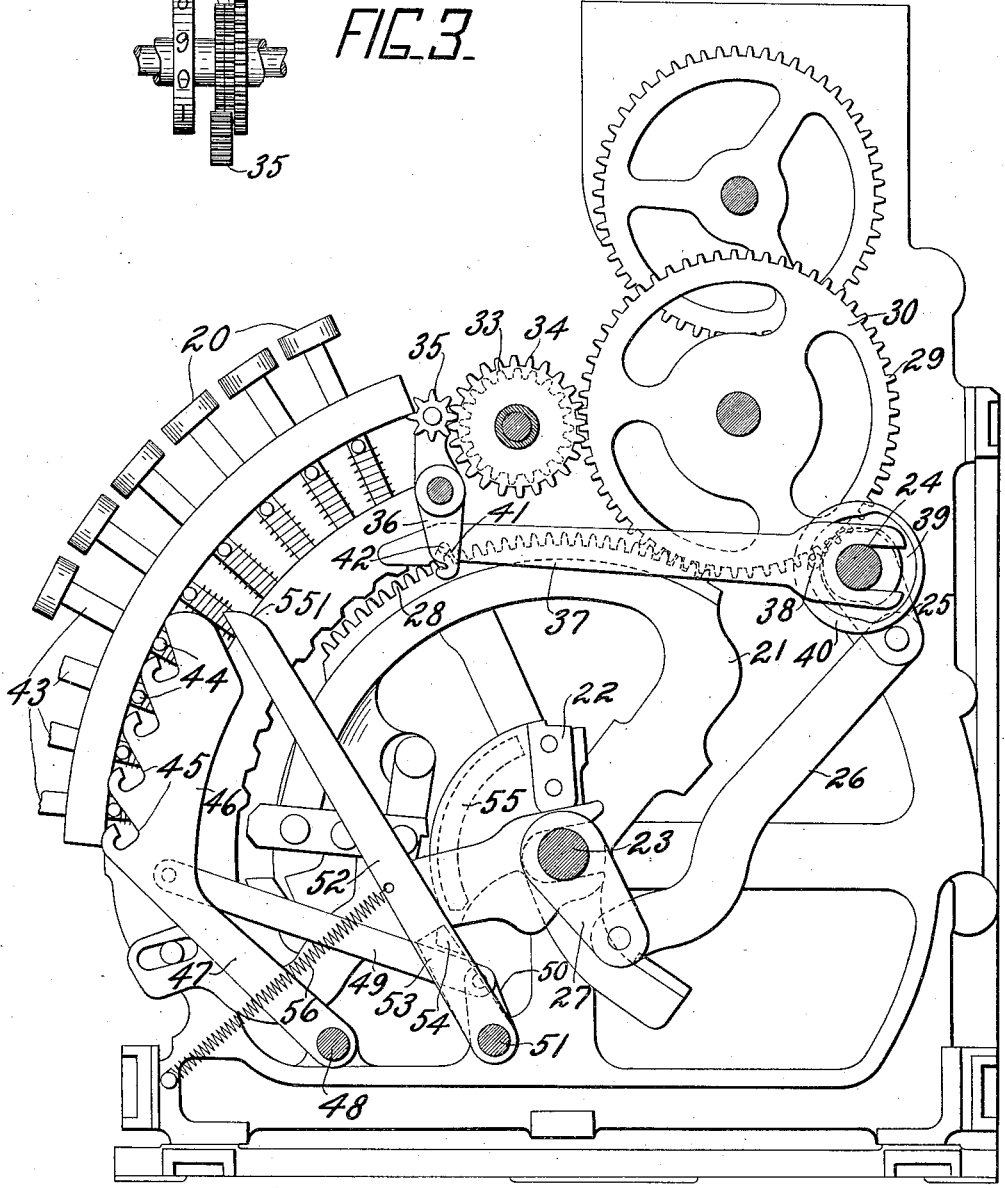

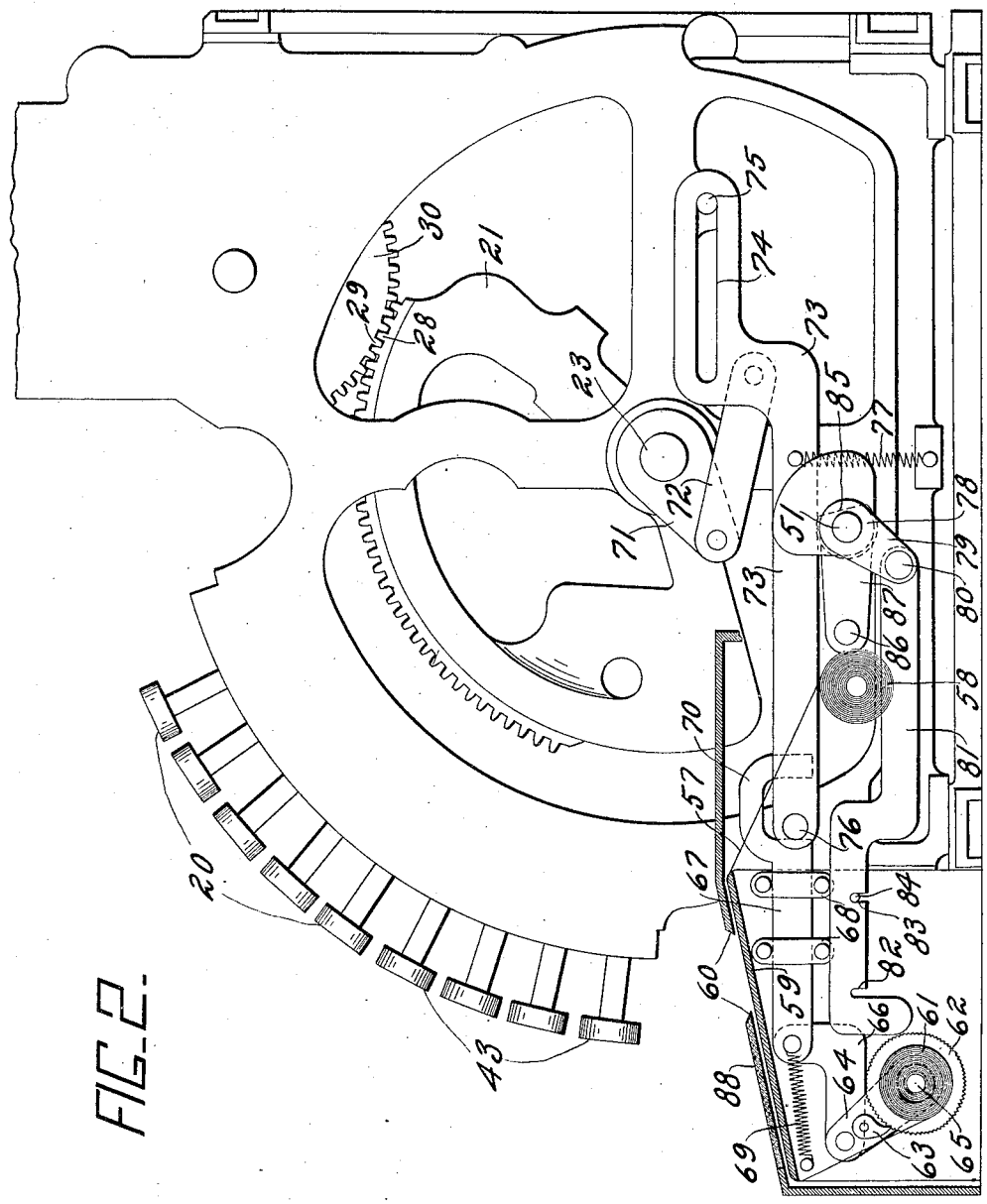

UNITED STATES PATENT OFFICE.

CHARLES PALMER, OF CATFORD, ENGLAND, BY ROBERT BRIDEN, OF LONDON, ENGLAND, RECEIVER IN LUNACY OF SAID PALMER.

CASH AND AUTOGRAPHIC REGISTER.

1,033,456.

Specification of Letters Patent.

Patented July 23, 1912.

Application filed September 26, 1910. Serial No. 583,924.

*To all whom it may concern:*

Be it known that I, ROBERT BRIDEN, a subject of the King of Great Britain and Ireland, residing at London, in England, am the receiver in lunacy of CHARLES PALMER, as appears by a certified copy of my appointment, which has been recorded in the assignment records of the Patent Office in Liber E 87, page 355, who has invented certain new and useful Improvements in Cash and Autographic Registers, of which I declare the following to be a full, clear, and exact description.

This invention relates to cash registers and has more particular relation to that class of registers provided with an autographic attachment including a strip of record material adapted to receive written entries of certain transactions.

The improvements are, for the sake of illustration, shown as applied to a machine of the type shown and described in Letters Patent of the United States granted to Frank H. Bickford, on January 7, 1902, and numbered 690554, and to Cleal and Reinhard, on April 12, 1897, and numbered 580378, and reference may be had to the said patents for a more detailed description of a machine of that type. The machine shown in the said patents is of the type known as a two motion machine, that is, keys are first depressed to determine the record to be made and the operation finally completed by crank or other suitable driving mechanism. In machines of this type it is customary to provide a series of special keys, in addition to the amount keys, which special keys are used in recording transactions other than cash such as "received on account", "charge", "paid out", and "no sale". It has also been customary when such special transactions are entered to place in the cash drawer of the machine a paper check or slip bearing data pertaining to the transaction, *e. g.*, in the case of a "charge" or "received on account" transaction, the name of the person to whose account the amount of the transaction is to be debited or credited, or in the case of a "paid out" transaction, why the money was paid out. With such a system there is always a possibility of one of the slips becoming lost, and the record is therefore not entirely reliable.

To correct the above defect in accounting systems the present improvement provides means whereby a positive check may be kept on all transactions.

The improvement comprises principally an autographic attachment in which all entries formerly made on separate slips may be made on the record strip.

In some systems it may be desired to have the autographic attachment operate only when recording the special classes of transactions while in other uses it is desired to have the attachment operated at each actuation of the machine.

The principal object of the invention is to provide improved controlling mechanism for the autographic attachment, said controlling mechanism being capable of adjustment to render the said attachment operative at each operation of the machine or solely when recording special classes of transactions.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of the said drawings; Figure 1 is a cross section of a machine of the type of machine shown in said Bickford, and Cleal and Reinhard patents. Fig. 2 is an end view of a machine of the same type with the present improvements shown as applied thereto. Fig. 3 is a detail view of the totalizer mechanism.

The operation of the machine to which the present improvements are shown as applied is substantially the same as shown in the above mentioned Letters Patent but for convenience may be briefly described as follows: The machine comprises a plurality of banks of keys 20 (see Fig. 1) any one of which keys when depressed serves as a stop for a differentially movable rocking segment rack 21. Only one bank of such keys 20 is shown, however, in the present application as the several banks which generally go to make up a complete machine for practical use, are mere duplicates in principle. The segment rack 21 receives its rocking movement from a segment 22 to which it is automatically coupled and uncoupled in a manner well known in the art and fully set forth in the above enumerated Letters Patent. Segment 22 is rigidly mounted on a rock shaft 23, to which power is transmitted from the main shaft 24 through the medium of a crank 25, a pitman 26, and an arm 27. Any form of power may be used for rotating the main shaft 24, either a crank handle or motor being preferred. The segment 21 is formed with teeth 28 meshing with similar teeth 29 formed on an intermediate gear 30, through the medium of which gear the differential movement of segment 21 is transmitted to the indicating and totalizing mechanisms.

The totalizing mechanism is substantially identical with that shown in the Cleal and Reinhard patent above mentioned. It comprises a plurality of totalizer wheels 31 (Figs. 1 and 3) each carrying a pinion 32 similar to a pinion 33 carried by a larger pinion 34 which latter pinion is constantly in mesh with the intermediate gear 30. The pinion 32 lies immediately beside the pinion 33 and is adapted to be coupled thereto by a broad pinion 35 carried by a rocking lever 36, which is adapted to be rocked at each operation of the machine to throw the pinion 35 into and out of mesh with the pinions 32 and 33 during the registering movement of segment 21. The rocking of lever 36 is effected by a pitman 37 connected at its forward end to said lever 36 and bifurcated at its rear end to straddle the shaft 24. The pitman 37 further carries an anti-friction roller 38 playing in a groove 39 formed in a box cam 40 rigidly mounted on the shaft 24. The said groove 39 is so formed as to rock the pinion 35 into and out of engagement with the pinions 32 and 33 once at each operation of the machine, but such engagement is maintained only during the time the segment 21 is being moved from its normal lower position to its final position of adjustment. It will thus be seen that the totalizing wheel 31 will be advanced an extent commensurate with the value of the key 20 depressed. The connection between the pitman 37 and lever 36 comprises a slot 41 formed in said pitman and a pin 42 carried by the lever, the purpose of this construction being to render the connection detachable for a purpose now to be described.

In recording certain transactions such as "change", "received on account", "paid out", and "no sale" the keys 20 are depressed, representing the amount involved. If such amounts were then entered on the totalizing mechanism it will readily be seen that the total thereon would not represent the amount of money to be found in the cash drawer. To correct this it is customary to provide what is known as a "throwout" mechanism for the totalizing mechanism. A convenient form of such mechanism for a machine of the type to which the present improvements are shown as applied is clearly shown and described in the patent to Bickford above referred to and a brief description will be given herein for the sake of clearness.

Only the five upper keys 20 of the bank of keys shown are amount or value keys while the four lower keys 43 are for the purpose of recording special transactions. Each of the latter keys 43 is provided with a laterally extending pin 44 which is arranged to engage the inclined notches 45 of a plate 46. The plate 46 through its arm 47 is journaled on a rod 48, so that whenever one of the keys 43 is depressed, the plate 46 will be swung upward and rearward.

Pivoted at its forward end to the plate 46 is a link 49, which at its rear end is pivoted to a short crank arm 50 fast on a rock shaft 51, so that the operation of one of the keys 43 will rock the shaft 51 to bring the upper end of an upwardly extending arm 52, also fast on said shaft 51, against the under side of the forward end of pitman 37. Also fixed on the shaft 51 is a short arm 53 on one side of which is formed a lug 54 having a beveled forward face. The lug 54 is normally just in front of an arc-shaped flange 55 carried by the segment 22. The depression of one of the keys 43 will cause said lug 53 to pass just beneath the lower end of the flange 55. Upon the subsequent operation of the machine and consequent rocking of segment 22 the flange 55 will engage the beveled face of the lug 54 and force the arm 53 rearward thereby further rocking the shaft 51. This further rocking of shaft 51 will cause the upper beveled end 551 of arm 52 to pass beneath the forward end of pitman 37 thereby elevating the said forward end to disengage notch 41 from pin 42. Therefore upon the operation of the machine and rotation of cam 40 the pinion 35 will not be rocked to engage pinions 32 and 33 and the amount represented by the keys depressed will not be registered on the totalizer. Upon the completion of an operation of the machine the lever 52 and all its coöperating parts will be restored to normal position by a spring 56.

With the use of the mechanism just described the totalizing mechanism at the end of each day represents exactly the amount of money received on cash sales during the day. It is, however, desirable to have some sort of record of transactions involving amounts of money received on account, charged, or paid out, and for this purpose, there is provided at the right hand end of the machine an autographic attachment.

The autographic attachment (Fig. 2) comprises an autographic strip 57 led from a supply roll 58, over a table 59, beneath a sight opening 60 in the inclosing casing, and down to a receiving roll 61. The receiving roll 61 is provided with a feeding ratchet 62 adapted to be actuated by a feeding pawl 63 carried by an arm 64 pivoted at 65 concentrically with the feeding ratchet 62 and the receiving roll 61. The arm 64 is connected by a link 66 to a sliding bar 67 mounted to slide in brackets 68 and held in normal position by a spring 69. At its rear end the bar 67 is provided with a hook 70 adapted to coöperate with a driving mechanism now to be described.

As the rock shaft 23 extends across the machine and is operated at every operation of the machine it forms a convenient power member for the autographic attachment. On the right hand end of shaft 23 is rigidly mounted a crank arm 71 which arm is connected by a driving link 72 to a sliding and rocking operating bar 73. The bar 73 is formed at its rear end with an elongated slot 74 surrounding a bearing pin 75 carried by the side frame of the machine. This pin forms a suitable pivot and bearing for the rocking and sliding movements of the bar 73.

At its forward end the bar 73 is provided with a pin 76 which, when the machine is adjusted to actuate the autographic feed at each operation, normally stands in the hook 70 of bar 67. It will then be seen that at each operation of the machine the bar 73 will be given a sliding reciprocating movement and consequently will actuate the autographic feed. A spring 77 normally tends to withdraw pin 76 from hook 70 but when the machine is in the condition just above described, and as shown in Fig. 2, the bar 73 rests on the upper edge of a cam 78 loosely mounted on shaft 51. The cam 78 is rigidly connected to a downwardly extending arm 79 which is pivotally connected at 80 to a forwardly extending controlling bar 81. The bar 81 is capable of movement to give the cam 78 two positions of adjustment and is provided with two notches 82 and 83 coöperating with a pin 84 on the side frame of the machine to hold said bar and cam in either of their adjusted positions. If at any time it is desired to have the autographic strip fed only when one of the special keys 43 is depressed, it is merely necessary to raise the forward end of bar 81 to disengage the notch 83 from pin 84 and force said bar back until notch 82 is in position to and does engage said pin. This operation causes a rotation of cam 78 to bring its flat side 85 beneath the bar 73. The bar 73 is then free to rock downward under the action of spring 77 to disengage pin 76 from hook 70. In this position the bar 73 rests on a stud 86 carried by an arm 87 fixed on the shaft 51. If a cash sale is then recorded the bar 73 will move idly forward and backward and no movement of the record strip will be had. If, however, a special transaction is to be recorded and one of the special keys 43 is depressed, such depression of the key, as above described, will cause a partial rocking movement of shaft 51 to position lug 54 beneath the flange 53. Upon the operation of the machine the shaft 51 will be still further rocked to "throw out" the totalizer and through the medium of arm 87 and stud 86 establish a coöperation between the driving mechanism and the autographic feed by elevating the bar 73 to cause its pin 76 to enter the hook 70. The hook 70 is designed to permit a slight preliminary movement of pin 76 independent of the autographic feed. This is for the reason that the pin 76 is given such movement during the time the shaft 51 is being rocked to "throw out" the totalizer and elevate bar 73. A plate 88 of transparent material such as glass, is provided in the inclosing casing to permit reading of the preceding records made on the record strip.

From the foregoing description it will be noted that the mechanism provided is simple and effective to perform the desired functions. If the machine is to be used in a manner rendering it desirable to make a written entry at each operation of the machine it is merely necessary manually to adjust the controlling bar 81 to cause notch 83 to engage pin 84. In this position of the bar 81 the driving means will constantly be held in coöperative relation with the feeding mechanism. If for some reason the operator should fail to make a written entry on the record strip said strip nevertheless will be advanced and the blank space caused thereby will indicate to the proprietor that a transaction had been recorded in the machine without first making an entry on the record strip. If it merely be desired to have the strip fed when recording a special transaction it will only be necessary to adjust the bar 81 to bring the other notch 82 into engagement with pin 84. This will place the establishment of a coöperative relation between the driving means and the record strip feed under the direct control of the special keys and the depression of any one of such keys will result in an advance of the record strip. Here again a failure to make the proper written entry will result in a blank space on the record strip which blank space will act as an indication to the proprietor of such failure.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a cash register the combination with a main operating mechanism and a series of keys, of a totalizer mechanism normally in coöperative relation with said main operating mechanism, an autographic device including feeding mechanism for a record strip capable of coöperative relation with said main operating mechanism, and means controlled by certain of said keys for destroying the coöperative relation between the main operating and the totalizer mechanisms and establishing a coöperative relation between said main operating and said feeding mechanism.

2. In a cash register the combination with a main operating mechanism and a series of keys, of a totalizer mechanism normally in coöperative relation with said main operating mechanism, an autographic device including feeding mechanism for a record strip capable of coöperative relation with said main operating mechanism, means controlled by certain of said keys for destroying the coöperative relation between the main operating and the totalizer mechanisms and establishing a coöperative relation between said main operating and said feeding mechanisms, and manually operable means for establishing such coöperative relation between the main operating mechanisms independent of an actuation of any of said keys.

3. In a cash register the combination with a main operating mechanism and a series of keys, of a totalizer mechanism normally in coöperative relation with said main operating mechanism, an autographic device including feeding mechanism for a record strip capable of coöperative relation with said main operating mechanism, and means set by an operation of certain of said keys and actuated upon an operation of the main operating mechanism for simultaneously destroying the coöperative relation between the main operating and the totalizer mechanisms and establishing a coöperative relation between the main operating and the feeding mechanisms.

4. In a cash register the combination with a main operating mechanism including a rock shaft, of an autographic device including a feeding mechanism for a record strip, a sliding and rocking bar adapted to be given a sliding movement at each operation of the rock shaft and a rocking movement into and out of coöperative relation with the feeding mechanism at the will of the operator, a cam for effecting such rocking movement and manually operated means for adjusting said cam.

5. In a cash register the combination with a series of keys and a main operating mechanism including a rock shaft, of an autographic device including a feeding mechanism for a record strip, a sliding and rocking bar adapted to be given a sliding movement at each operation of the rock shaft and a rocking movement into and out of coöperative relation with the feeding mechanism, and an arm controlled by certain of said keys and a pin carried by said arm and adapted to engage and rock said lever into such coöperative relation whenever one of said certain keys is operated.

In witness whereof I have signed this specification in the presence of two witnesses.

ROBERT BRIDEN.

Witnesses:
A. J. HADDEN,
A. E. HATHAWAY.

---

Copies of this patent may be obtained for five cents each, by addressing the "Commissioner of Patents, Washington, D. C."